Sept. 14, 1965          R. K. PORTER          3,205,682
FLEXIBLE SHAFT COUPLING
Filed April 3, 1963
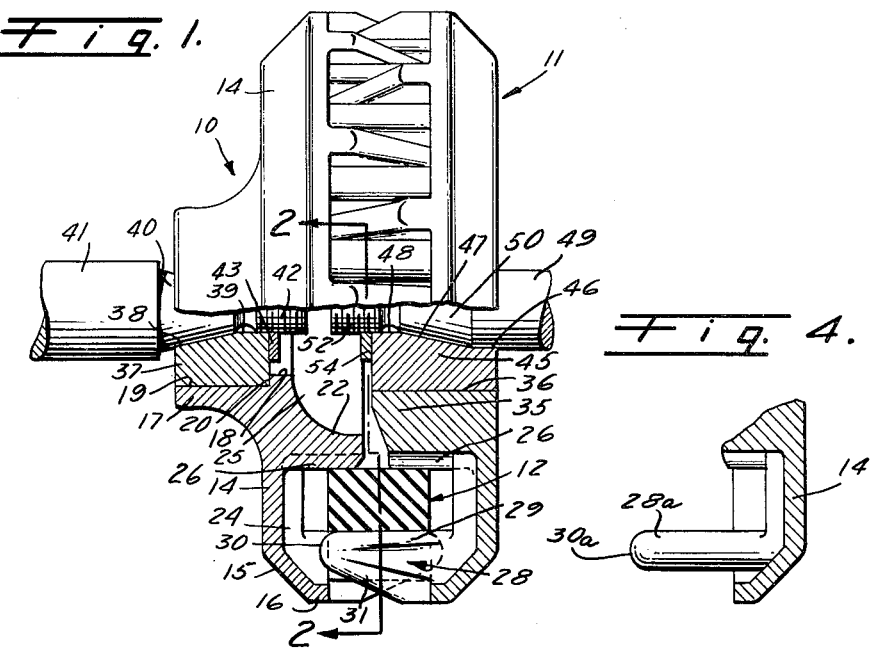
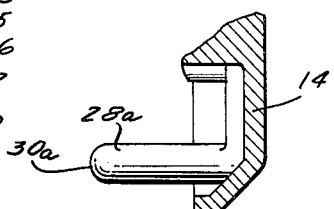
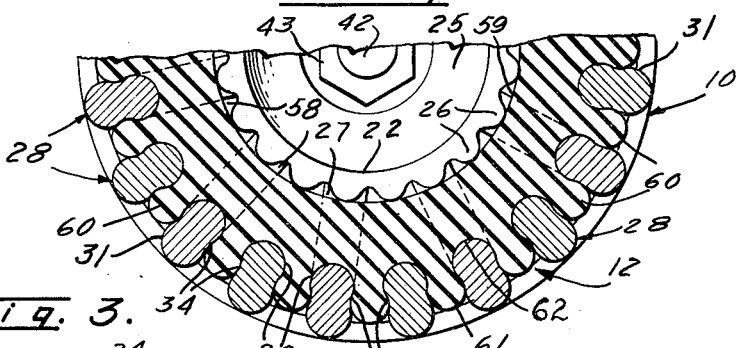
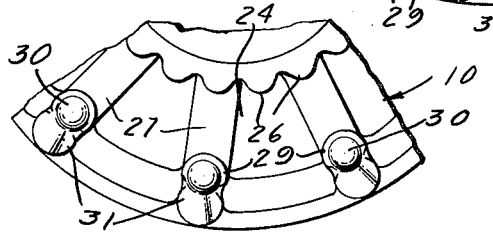
Robert Keith Porter,
INVENTOR.
WHANN & McMANIGAL
Attorneys for Applicant

United States Patent Office 3,205,682
Patented Sept. 14, 1965

3,205,682
FLEXIBLE SHAFT COUPLING
Robert Keith Porter, Los Angeles, Calif., assignor to McCulloch Corporation, Los Angeles, Calif., a corporation of Wisconsin
Filed Apr. 3, 1963, Ser. No. 270,216
8 Claims. (Cl. 64—14)

This invention relates generally to flexible couplings or shafts and relates more particularly to improvements in flexible couplings adapted to connect together adjacent ends of power transmission shafts.

While the invention has particular utility embodied in flexible couplings for power transmission shafts, and is shown and described as embodied in such a coupling, it is to be understood that its utility is not confined thereto.

As is well known, there are various problems and difficulties involved in the provision of a suitable coupling for power transmission shafts and it is an object of the present invention to provide a coupling that will overcome such difficulties and solve such problems.

It is another object of the invention to provide a device of this character including a resilient shock resisting element sandwiched between driving and driven coupling members.

It is still another object to provide a device of this character having maximum resistance to compression set.

It is a further object of the invention to provide a device of this character that will have maximum resistance to tearing.

It is a still further object of the invention to provide a device of this character adapted to operate in relatively high temperatures or relatively high temperature environments and at high speeds.

It is another object of the invention to provide a device of this character having a variable spring rate.

Still another object of the invention is to provide a device of this character wherein initially the spring constant is low and the load is reacted by said resilient element in tension, bending and compression.

A further object of the invention is to provide a device of this character wherein, as the deflection and load is increased, the spring constant increases and the load is reacted primarily by compression in said resilient element.

It is a still further object of the invention to provide a device of this character wherein the surfaces of the load carrying parts of the resilient element and the coupling members at opposite sides thereof are specifically shaped to avoid any flat surfaces to thereby assist in obtaining a non-linear low initial and high final spring rate.

It is another object of the invention to provide a device of this character which minimizes sharp impact blows on the drive side.

Another object of the invention is to provide a device of this character that minimizes or eliminates unbalanced conditions and rubber displacement due to centrifugal loads.

It is still another object of the invention to provide a device of this character which eases the loads on the drive system and lengthens the service life of all the working parts.

It is a further object of the invention to provide a device of this character having maximum support for centrifugal loads acting on the resilient element.

It is a still further object of the invention to provide a device of this character wherein the projections or parts providing maximum support for centrifugal loads acting on the resilient element also serve to transfer the torque loads and hence serve a double purpose.

It is another object of the invention to provide a device of this character that is effective and efficient in operation.

It is still another object of the invention to provide a device of this character that is simple and rugged in construction.

It is a further object o fthe invention to provide a device of this character that is relatively inexpensive to manufacture.

The characteristics and advantages of the invention are further sufficiently referred to in connection with the following detailed description of the accompanying drawings, which represent certain embodiments. After considering these examples skilled persons will understand that variations may be made without departing from the principles disclosed and I contemplate the employment of any structures, arrangements or modes of operation that are properly within the scope of the appended claims.

Referring to the drawings, which are for illustrative purposes only:

FIG. 1 is a side view of a coupling embodying the present invention, portions being broken away to show the interior or construction and relationship with the parts;

FIG. 2 is an enlarged sectional view taken on line 2—2 of FIG. 1;

FIG. 3 is a fragmentary view of the arrangement shown in FIG. 2, without the resilient element therein; and FIG. 4 shows an alternative arrangement.

Referring more particularly to FIGS. 1, 2 and 3, there is shown a coupling device embodying the present invention and comprising a drive member, indicated generally at 10, a driven member, indicated generally at 11, and a resilient element, indicated generally at 12, operably disposed between the driving member and the driven member.

The driving or driver member 10 comprises an annular shell defined by a disc portion or wall 14 normal to the axis of the shell. The wall 14 has an outwardly and forwardly flared peripheral flange 15 terminating at the outer edge in a forwardly extending annular edge portion 16. A hub 17 extends axially rearwardly or in the opposite direction from the flange 15 and said shell has an axial bore therethrough which includes an inner portion 18 and an enlarged outer portion 19, there being a shoulder 20 at the junction of said bore portions 18 and 19.

Within the shell there is an axially arranged flange 22 which extends from the wall 14 in the opposite direction from the hub 17, said flange 22 being longer than the flange 15 with its portion 16, so that said flange 22 extends forwardly beyond the plane of the rim of the portion 16 of flange 15. Flange 22 is of substantially smaller diameter than the diameter of the periphery of the portion 16, thereby defining with the wall 14 and flange 15, with its part 16, an annular space 24, said flange 22 also defining a central recess 25.

The exterior of flange 22 is formed with a plurality of annularly spaced longitudinally extending ribs or teeth 26 and there are a plurality of annularly spaced webs 27 which radiate outwardly from said flange 22 across the annular space 24 and join the flange 15. The height of the webs 27 is such that the outer or free surfaces are in substantially the same plane as the rim of the part 16 of flange 15.

At the outer end of each web there is a finger or prong 28 which projects axially forwardly beyond the plane of the free edge of flange 22. Each of the fingers 28 has a generally cylindrical portion 29 rounded at the free end 30 and a tapered portion 31 at the radially outward side. Thus each finger tapers forwardly and radially inwardly to the inner end and has longitudinally extending oppositely arranged side grooves that are concave in section and said fingers have a generally figure eight (8) configuration in cross section where the section includes the side grooves of the finger. This is best shown in FIG. 2.

The driven member 11 is of similar construction. However, the driven member does not have a hub extending outwardly from the wall 14 thereof. Further, the driven member 11, instead of having a flange such as 22 in the member 10, has a boss 35 which is of the same external diameter as the flange 22 and is provided with a plurality of longitudinally extending annularly spaced ribs or teeth 26. When the members 10 and 11 are in operative relationship relative to each other, the respective teeth or ribs on the members 10 and 11 are in substantial alignment. Member 11 also has an axial bore 36 therethrough.

Each of the hub members 10 and 11 is shown as an integral casting of any suitable metal. Aluminum has been found to be a very satisfactory metal for these members although other material may be used. The bore 19 of the driving member 10 is provided with a hub member 37 which is cast in place. Of course this member may be otherwise suitably secured in the bore 19.

Hub member 37 is provided with an inwardly tapering bore 38 which terminates in a cylindrical bore portion 39. The bore portion 38 of the hub member 37 is adapted to receive a frusto-conical end portion 40 of a drive shaft 41. From the inner smaller end of the frusto-conical part 40 there is a cylindrical externally threaded shaft end portion 42 which extends through the cylindrical bore portion 39 and is provided with a nut 43 for securing the inner end of shaft 41 in place.

Driven member 11 is provided with a hub member 45 secured in the bore 36. This member 45 may be cast in place or otherwise secured in the bore 36.

Hub member 45 is provided with an axial bore which at its outer end is cylindrical, as indicated at 46 and tapers at 47 to a smaller cylindrical bore portion 48 at the inner end. This bore is for a driven shaft 49 which has a full diameter portion received in the outer bore portion 46, a frusto-conical tapering portion 50 received in the tapering portion 47 and a cylindrical externally threaded end portion 52 which is received in the reduced diameter cylindrical portion 48. The shaft is secured in place by means of a nut 54 on the externally threaded portion 52.

The resilient element 12, which may be termed a shock resisting biscuit, is operably disposed between the driving member 10 and driven member 11. This biscuit may be of rubber, either natural or synthetic, or any other suitable material having the required characteristics of shock resistance, resistance to compression set and to tearing and ability to operate under relatively high temperature conditions and/or other qualities required for specific types of installation. It has been found that silicon rubber provides an excellent material for the biscuit 12.

Biscuit 12 is generally annular in shape and has a relatively large central opening 58 defined by a cylindrical wall 59, opening 58 being of approximately the same diameter as the maximum external diameter of the ribbed flange 22 of the driving member 10 and the external diameter of the ribbed boss 35 of the driven member. In other words, the internal diameter of the opening 58 in the biscuit is substantially the same as the outside diameter of flange 22 measuring from the radially outward or top sides of diametrically opposite ribs or teeth. Since the boss 35 of the driven member 11 has the same outside dimension, inner portions of both said flange and said boss are receivable in the opening 58 of the biscuit. It is to be noted that the biscuit is of such axial extent or thickness as to receive an inner end portion of said flange and an inner end portion of said boss. Moreover, the thickness of said biscuit is sufficiently great so as to space the inner or free end of flange 22 from the adjacent end of boss 35 to thereby permit a certain degree of angular deviation or axial misalignment of the driving and driven parts without a metal-to-metal contact between said flange 22 and boss 35.

Externally, the biscuit is provided with a plurality of annularly spaced longitudinally or axially extending ribs or teeth 60. These teeth are rounded at their outer ends, as at 61, and the bottoms 62 of the valleys or spaces between adjacent teeth are also rounded or arcuate. As best shown in FIG. 2, the outer end portions of the teeth are diametrically wider at the center of the radius of the curvature of the outer ends than at the narrowest parts which are comparable to the flank of the teeth of gears.

When the coupling is assembled with the biscuit 12 disposed between the driving member and the driven member, the fingers of the driving member are received in the alternate spaces between the teeth of the biscuit and the configuration of the teeth of the biscuit corresponds to the configuration of the fingers 28 so that there is a snug fit between said fingers and the adjacent portions of the teeth at opposite sides thereof.

The fingers of the driven member 11 are also spaced annularly apart a distance equal to the distance between alternate valleys between the teeth of the biscuit and the fingers of said driven part are received in the alternate spaces left between the fingers of the driving member and there is the same close fit between the fingers of the driven member and the adjacent surfaces of the biscuit.

Referring further to FIG. 2, it will be noted that the surfaces of the load carrying members or teeth of the biscuit and the surfaces of the fingers of the coupling members are curved and avoid any flat surfaces. With this arrangement a very effective non-linear low initial and high final spring rate is provided. Also the biscuit has high shock resisting characteristics, as well as high torque absorbing qualities.

Initially the spring constant of the biscuit is low and the load is reacted by the biscuit in tension, bending and compression. As deflection and load is increased spring constant increases and the load is reacted primarily in compression in the biscuit and the variable spring rate is obtained by the matching configuration of the biscuit and the metal coupling parts or driving and driven members.

It has been found that the ribs 26 on the flange 22 and on the boss 35 provide a more satisfactory control of the compression and torque forces to which the coupling is subjected.

Referring to FIG. 4, there is shown an alternative arrangement in which the fingers which engage the biscuit comprise cylindrical rods 28 which project longitudinally from the respective walls 14 of the driving and driven members. The free ends of the fingers 28a are rounded as at 30a and said fingers 28a engage the bottom walls of the valleys or spaces between adjacent teeth of the biscuit.

It is thought that the invention and its attendant advantages will be understood from the foregoing description and it is believed that it will be apparent that various changes may be made in the form, construction and arrangement of the parts of the invention without departing from the spirit and scope thereof or sacrificing its material advantages, the arrangements hereinbefore described being merely for purposes of illustration.

I claim:
1. A coupling assembly comprising:
   (A) a pair of oppositely arranged integral metal members, one of said members being a driving member and the other a driven member, each of said members having a circular wall normal to the axis thereof, an annular flange flaring outwardly of said wall and away from the plane thereof and terminating in a cylindrical rim portion;
   (B) a central axially arranged element within said members, said element having a plurality of annularly spaced longitudinally extending external teeth thereon, the central element having an effective external diameter substantially smaller than the internal diameter of said cylindrical rim portion of said annular flange thereby defining with the flange and adjacent portion of said wall an annular recess;

(C) a plurality of annularly spaced radial ribs radiating from said central element to the flange, said ribs having a height no greater than the height of said flange from said wall;

(D) a finger projecting longitudinally of the member from each radial rib adjacent the outer end thereof, each finger comprising a portion arcuate in cross section and of greater arcuate extent than the diameter thereof, the free end of said arcuate portion being rounded, and an outer portion tapered from the base toward the free end and being arcuate in cross section and of greater arcuate extent than the diameter thereof, the cross sectional shape of said finger being generally in the shape of a figure eight (8), there being oppositely arranged longitudinally extending grooves in the opposite sides of the finger, said grooves being concave in cross section;

(E) and an annular resilient biscuit operably disposed between the driving and driven members, said biscuit having an axial opening therein snugly receiving the central externally toothed elements of the respective driving and driven members, the thickness of said resilient biscuit being sufficient to space the adjacent free ends of said central externally toothed elements of said members axially apart, and a plurality of said annularly spaced radially extending external teeth on said resilient biscuit, the outer end of each tooth being arcuate in cross section, the arcuate extent thereof being greater than the diameter of the tooth, and the bottom of the valley between adjacent teeth being arcuate and of greater arcuate extent than the diameter of said arcuate bottoms of said valley, the ends of the arcuate bottoms of the valleys merging with the respective adjacent ends of the arcuate end portions of the teeth in a curve, the spacing of the fingers of the driving and driven members being the distance between every-other-tooth and the dimension and shape of said fingers being such that the fingers of one member are snugly received in the valley between every-other-tooth and the fingers of the other member are snugly received in the valleys unoccupied by the fingers of the one member, the size and shape of the fingers and teeth being such that there is intimate contact between adjacent parts and all contacting surfaces are curved.

2. A flexible coupling, comprising:
(A) a pair of oppositely arranged members, one of said members being a driving member and the other a driven member, each of said members being in the general shape of a shallow cup;
(B) a central axially arranged element in each member substantially smaller in diameter than said member and having a plurality of annularly spaced longitudinally extending teeth thereon;
(C) a plurality of annularly spaced radial ribs radiating from said central element to the periphery of said member;
(D) a finger projecting from each rib adjacent the outer end thereof and longitudinally of the member, each finger comprising a portion arcuate in cross section and of greater arcuate extent than the diameter thereof, the free end of said arcuate portion being rounded, and an outer longitudinally tapering portion tapered from the base toward the free end and being arcuate in cross section and of greater arcuate extent than the diameter thereof, the cross sectional shape of said finger being generally in the shape of a figure eight (8), there being oppositely arranged longitudinally extending grooves, concave in cross section, in the opposite sides of each finger so that said fingers in cross section are generally in the shape of a figure eight (8);

(E) and an annular resilient biscuit operably disposed between the driving and driven members, said biscuit having an axial opening therein snugly receiving the central externally toothed elements of the driving and driven members, the thickness of said resilient biscuit being sufficient to space the adjacent free ends of the central elements of said members axially apart, and a plurality of said annularly spaced radially extending external teeth on said resilient biscuit, the outer end of each tooth being convexly rounded in cross section, and the bottom of the valley between adjacent teeth being concavely rounded in cross section, the bottoms of the valleys merging with the respective adjacent ends of the rounded ends of the teeth in a curve, the fingers of the driving members being snugly received in alternate spaces between the teeth and the fingers of the other member being received in the spaces unoccupied by the fingers of the one member, said size and shape of the fingers and teeth being such as to have intimate contact between adjacent parts with all contacting surfaces curved.

3. In a flexible coupling for power transmitting shafts:
(A) a driving member and a driven member, each of said members having
(a) an annular wall normal to the axis of the coupling,
(b) a central axially arranged element on one side of said wall of smaller diameter than said wall,
(c) a plurality of annularly spaced longitudinally extending teeth on said element,
(d) a plurality of annularly spaced fingers carried by said wall and projecting longitudinally forwardly of said wall, said fingers having longitudinally extending, oppositely arranged concave grooves in the sides thereof so that the cross sectional shape of said fingers is generally in the shape of a figure eight (8);
(B) and an annular, resilient biscuit operably disposed between the driving and driven members, said biscuit having an axial opening therein receiving the central elements of the driving and driven members, said biscuit spacing the adjacent ends of said central elements apart,
(a) and a plurality of annularly spaced radially extending teeth on said resilient biscuit,
(b) the fingers of the driving and driven members being alternately positioned when the coupling is in its assembled arrangement,
(c) the teeth of said resilient biscuit being disposed between said fingers,
(d) all of the contacting surfaces of said fingers with said teeth being curved.

4. In a flexible coupling for power transmitting shafts:
(A) a driving member and a driven member, each of said members having
(a) an annular wall normal to the axis of the coupling,
(b) a central axially arranged externally toothed element carried by said wall at one side thereof and of smaller diameter than said wall,
(c) a plurality of annularly spaced fingers carried by said wall and projecting longitudinally forwardly of said wall,
(B) and an annular, resilient biscuit operably disposed between the driving and driven members, said biscuit having an axial opening therein operably receiving the externally toothed central elements of the driving and driven members and being of sufficient thickness to space the central elements,
(a) and a plurality of annularly spaced radially extending teeth on said resilient biscuit, (b) the fingers of the driving and driven members being received in the spaces between the teeth of said biscuit, (c) the contacting surfaces of said fingers and teeth being curved.

5. In a flexible coupling for power transmitting shafts:

(A) a driving member and a driven member, each of said members having (a) an annular wall normal to the axis of the coupling, (b) a central axially arranged element on one side of said wall of smaller diameter than said wall, (c) a plurality of annularly spaced longitudinally extending teeth on said element, (d) a plurality of annularly spaced fingers carried by said wall and projecting longitudinally forwardly of said wall, said fingers being round in cross section;

(B) and an annular, resilient biscuit operably disposed between the driving and driven members, said biscuit having an axial opening therein receiving the externally toothed central elements of the driving and driven members, said biscuit spacing the adjacent ends of said central elements apart, (a) and a plurality of annularly spaced radially extending teeth on said resilient biscuit, (b) the fingers of the driving and driven members being received in alternate spaces respectively between the teeth of said biscuit, there being a tooth of said biscuit between adjacent fingers of said members, the size and shape of the fingers and teeth being such as to have intimate contact between adjacent parts, all contacting surfaces being curved, (c) the fingers of the driving and driven members being alternately positioned when the coupling is in its assembled arrangement, (d) the teeth of said resilient biscuit being disposed between said fingers, (e) all of the contacting surfaces of said fingers with said teeth being curved.

6. In a flexible coupling for power transmitting shafts:

(A) a driving member and a driven member, each of said members having (a) a wall adapted for rotation on an axis, (b) a central axially arranged element on one side of said wall and of smaller diameter than said wall, (c) a plurality of annularly spaced longitudinally extending teeth on said element, (d) a plurality of annularly spaced fingers carried by said wall and projecting longitudinally forwardly of said wall, said fingers having longitudinally extending, oppositely arranged concave grooves in the sides thereof so that the cross sectional shape of said fingers is generally in the shape of a figure eight (8);

(B) and an annular, resilient biscuit operably disposed between the driving and driven members, said biscuit having an axial opening therein receiving the central elements of the driving and driven members, said biscuit spacing the adjacent ends of said central elements apart, (a) and a plurality of annularly spaced radially extending teeth on said resilient biscuit, (b) the fingers of the driving and driven members being received in alternate spaces respectively between the teeth of said biscuit, there being a tooth of said biscuit between adjacent fingers of said members, the size and shape of the fingers and teeth being such as to have intimate contact between adjacent parts, all contacting surfaces being curved.

7. A coupling member, comprising:

(A) a wall for attachment to a power transmitting shaft, an annular peripheral flange on said wall, said flange flaring outwardly of said wall and away from the plane thereof and terminating in a cylindrical rim portion, said wall and flange defining a shallow cup-shaped part;

(B) a central axially arranged element in the cup-shaped part, said element having a plurality of annularly spaced longitudinally extending teeth thereon, the central element having an effective external diameter substantially smaller than the internal diameter of said flange rim portion thereby defining with the flange and adjacent portion of said wall an annular recess;

(C) a plurality of annularly spaced radial webs radiating from said central element to the flange;

(D) and a finger projecting longitudinally from each web adjacent the outer end thereof, the free end of said fingers being rounded, there being oppositely arranged longitudinally extending concave grooves in opposite sides of each finger so that the cross sectional shape of said finger is generally in the shape of a figure eight (8).

8. In a member for axial attachment to a power transmitting shaft:

(A) a wall adapted for rotation on said axis;

(B) a central axially arranged element on one side of said wall and of smaller diameter than said wall;

(C) a plurality of annularly spaced longitudinally extending teeth on said element;

(D) a plurality of spaced radial ribs radiating from the central element to the wall and merging with;

(E) a plurality of annularly spaced fingers substantially circular in cross section carried by said wall and projecting longitudinally forwardly of said wall.

References Cited by the Examiner

UNITED STATES PATENTS

| | | | |
|---|---|---|---|
| 2,356,572 | 8/44 | Dornig | 64—14 |
| 2,502,790 | 4/50 | Jencick | 64—14 |
| 2,706,897 | 4/55 | Holoye | 64—14 |
| 2,867,102 | 1/59 | Williams | 64—11 |
| 2,902,842 | 9/59 | Byrom | 64—14 |
| 2,924,082 | 2/60 | Reich | 64—13 |

BROUGHTON G. DURHAM, *Primary Examiner.*

ROBERT C. RIORDON, *Examiner.*